(12) United States Patent
Roos et al.

(10) Patent No.: US 6,611,909 B1
(45) Date of Patent: Aug. 26, 2003

(54) METHOD AND APPARATUS FOR DYNAMICALLY TRANSLATING PROGRAM INSTRUCTIONS TO MICROCODE INSTRUCTIONS

(75) Inventors: Tobias Roos, Bromma (SE); Dan Halvarsson, Stockholm (SE); Tomas Jonsson, Södertälje (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/201,855

(22) Filed: Dec. 1, 1998

(30) Foreign Application Priority Data

Dec. 2, 1997 (SE) .............................................. 9704475

(51) Int. Cl.$^7$ ................................................ G06F 9/22
(52) U.S. Cl. ..................... 712/226; 712/211; 712/229; 712/43; 712/245
(58) Field of Search ................................ 712/211, 209, 712/226, 227, 229, 43, 245, 246, 247, 248

(56) References Cited

U.S. PATENT DOCUMENTS

| | | | | |
|---|---|---|---|---|
| 3,522,589 A | * | 8/1970 | Thron et al. ................ | 712/248 |
| 3,634,883 A | * | 1/1972 | Kreidermacher ............ | 712/248 |
| 3,949,370 A | * | 4/1976 | Reyling, Jr. et al. ........ | 712/245 |
| 4,063,310 A | * | 12/1977 | McDonald ................... | 712/245 |
| 4,459,666 A | * | 7/1984 | Kruger ........................ | 712/248 |
| 4,472,772 A | * | 9/1984 | Flora ........................... | 712/248 |
| 4,509,114 A | * | 4/1985 | Leininger et al. ........... | 712/245 |
| 4,587,611 A | * | 5/1986 | Amdahl et al. .............. | 712/248 |
| 4,691,278 A | * | 9/1987 | Iwata .......................... | 712/245 |
| 5,046,040 A | * | 9/1991 | Miyoshi ...................... | 712/211 |
| 5,452,423 A | * | 9/1995 | Picard et al. ................ | 712/210 |
| 5,617,574 A |   | 4/1997 | Boutaud et al. |   |

FOREIGN PATENT DOCUMENTS

WO 92/02883 2/1992

OTHER PUBLICATIONS

Microsoft Press Computer Dictionary, second edition, 1994, pp. 372–373.*

* cited by examiner

*Primary Examiner*—Richard L. Ellis

(57) ABSTRACT

In a computer system the instruction decoding unit for translating program instructions to microcode instructions operates dynamically. Thus the unit receives state signals indicating the state of the computer, such as a trace enabling signal, influencing the translation process in the instruction decoding unit. These state signals are added to the operation code of the program instruction to be decoded, the operation code of the program instruction thus being extended and used as input to a translating table, the extended operation code of the program instruction being taken as an address of a field in the table. The addresses and thus the contents of the fields addressed for the same operation code of a program instruction can then be different for different values of the state signals. Thus generally, the state signals cause the instruction decoder to change its translating algorithm so that the decoder can decode an operation code differently depending on the state which the signals adopt. The dynamic decoding can for a trace enabling signal be used for switching on and off a trace function. In the normal case, when tracing is not desired, no microinstructions supporting the trace function have to executed and thereby the performance and in particular the speed of the computer system will be increased.

11 Claims, 3 Drawing Sheets

METHOD AND APPARATUS FOR DYNAMICALLY TRANSLATING PROGRAM INSTRUCTIONS TO MICROCODE INSTRUCTIONS

The present invention relates to a method and a device for instruction decoding in a digital processor.

BACKGROUND

An execution unit of a computer such as a microprocessor sometimes includes support for a trace function. Tracing is used by an assembler programmer to follow the execution of a program executed by the processor. When a trace condition is met, information on the current state of registers in the processor is output to a printer connected to the microprocessor or to a file in some mass storage used by the microprocessor.

A trace condition can be a multitude of different things, or in other words, there are many different events that can trigger the trace function. Example of such events can be:

the execution of every instruction;

the execution of only such instructions which include a jump that is taken;

the execution of only instructions having an assembler address matching an address entered into a monitoring system for the trace condition;

that a task or job is finished or that the execution of a program module is finished or that a switch from one job to another job is done, such as for an interrupt condition.

The trace function is used when debugging a program executed in the microprocessor. The trace function then enables the assembler programmer or "debugger", i.e. the person who has the task of correcting errors in the written program code, to follow the program flow which is made by e.g. checking whether an instruction at a certain address is executed or not. The trace function is a very powerful tool when debugging. A trace function can generally be implemented by modifying the original program code by introducing suitable instructions called break-points. However, such an introduction of additional instructions will change the length of the program and also highly affect the timing of the execution of the different instructions of the program code. Microprocessors having built-in tracing functions allow a tracing to be made without affecting the original program code, not changing the time required for executing instructions as much as in the case where additional break-instructions have to be entered in the code.

A microprocessor of the type having a high performance and operating at high speed conventionally has an execution core which in most cases uses microcode, which comprises microinstructions or microinstruction codes. The microinstructions are thus the instructions which are actually executed by the execution core or arithmetic and logical core of the processor. The microinstructions are obtained by translating the original program code in an instruction decoder comprised in the processor, before actually executing the instructions in the execution core. In order that a microprocessor shall support tracing, this function is generally incorporated in the microcode, which thus comprises support for enabling the trace functions. In a microprocessor allowing tracing usually a master signal is used for enabling all types of traces, this master signal being called a trace enable signal.

Furthermore, when executing microcode in a microprocessor having a trace function, the processor has to check all microinstructions in the microcode for the trace conditions. Such constant checking costs a share of the execution time of the processor even in the case where the trace condition is not enabled, since then at least the trace enable signal has to be checked for each microinstruction.

This may even result in that the microcode or microprogram has to contain additional microinstructions in order to check whether the trace function is enabled or not. The existence of such additional microinstructions naturally cause delays compared to the case where they are not included in the microcode. Such delays will then somewhat slow down the computer and will reduce its performance, and are hence generally not desired.

For processors e.g. used for special purposes there may also occur that other conditions or control signals have to influence the decoding or translating of program instructions into microinstructions. Thus, the translating of a program instruction signifying "End Of Job" can result in different microinstructions depending on the situation, i.e. whether this instruction signifies the end of a local or a global job or signifies the start of a new job.

In the published International patent application WO 92/02883 parallel-processing systems are disclosed, in which each of a plurality of processors receives the same microcode instructions. Each processor has an instruction decode logic circuit. The decode circuit also receives a condition signal derived from internal and/or external signals, so that the circuit will decode conditional instructions differently in dependence upon the condition signal. As specified on pages 55–58 the microcodes are thus extended by one extra condition bit. Such an addition will obviously require a more complex decoding of microinstructions when actually executing them which results in a lower processing rate.

In U.S. Pat. No. 5,617,574 a data processing device is disclosed in which conditional instructions in the conventional way can test status bits.

SUMMARY

It is an object of the present invention to provide a method and a device for providing a versatile translation of program instructions to be executed by a processor to microinstructions used by the core of the processor.

It is another object of the present invention to provide a method and a device by means of which the delay problem associated with having additional microinstructions inside the microprogram for checking whether the trace function is active is reduced.

A problem to be solved by the invention is thus how to arrange the decoding of "ordinary" program instructions into microinstructions in a way which will cause as little delays as possible for a processor having an optional tracing function.

The objects as mentioned above and others are generally obtained by supplementing the instruction decoder of a microcomputer with at least one additional signal, which signal indicates a state of the computer or of the processing made in the computer, such as whether or not a trace function is used. Depending on the value or values of the at least one additional signal, e.g. depending on whether the trace function is used or not, the decoding of the operation codes is altered so that for at least one input instruction different microinstructions are executed for different values of the at least one signal, i.e. in the respective particular case, so that for the state comprising that tracing is used at least one input instruction is translated to a microinstruction different from that microinstruction into which it would have been translated in the case where tracing is not enabled.

This results in the particular case as described above in that when the supplementary trace signal is switched off a microprogram not using trace functions or trace checks is run in the computer or microprocessor, and if the trace signal is switched on other microinstructions, supporting the trace function are executed by the computer. By not using microinstructions supporting a trace function, when such a function is not needed, execution time in the processor is saved, which in turn increases the performance of the computer, the computer still allowing that the trace function can be enabled when required or wanted.

Hence, the start address of a microcode sequence corresponding to an assembler instruction is determined by the operation code found in the assembler instruction. If the operation code is extended by a bit controlled by a signal, a trace enable signal, it is possible to execute two different microcode sequences depending on if the trace function is enabled or not.

The microcode, which is run when trace enable is set, checks for all trace conditions, while the other sequence does not have to check for trace at all. This arrangement therefore increases the capacity when trace is not enabled.

Additional objects and advantages of the invention will be set forth in the description which follows, and in part will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments presented hereinbelow with reference to the accompanying drawings, in which:

DETAILED DESCRIPTION

Figure 1:
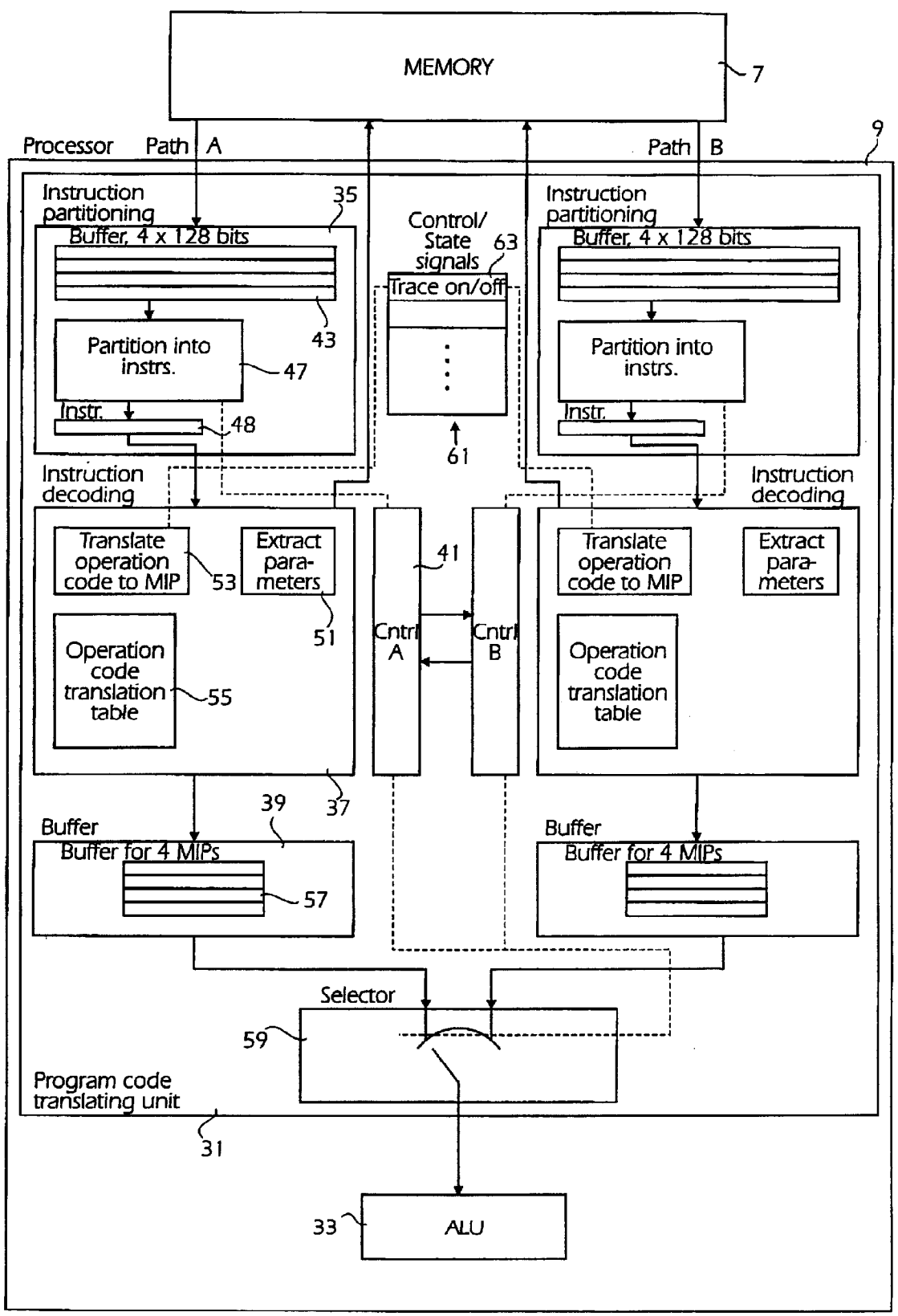
FIG. 1 is a block diagram of a part of a microcomputer.

In the block diagram of FIG. 1 a microcomputer is illustrated, having a memory 7 connected to a central processing unit, CPU 9. In particular the essential parts of a code translating unit 31 are shown, which is included in the CPU 9 together with an arithmetic/logic unit 33 performing the very execution of microinstructions. The translating unit 31 has two parallel data paths, A and B, which make a preprocessing of the instructions to be executed in the arithmetic/logic unit 33, preparing the instructions and delivering them so that the arithmetic/logic unit 33 can execute them as fast as possible. Each path to A and B has an instruction partitioning unit 35, an instruction decoding unit 37 and a buffer unit 39, the choice of current path selected being controlled by a control unit 41, one for each path A and B.

The instruction partitioning unit 35 has a buffer 43, the instruction cache memory, for four lines of program code, each line containing 128 bits or eight words, these lines always holding successive data as fetched from successive positions in the memory 7. The partitioning unit 35 also comprises an execution block 47 for making the very partitioning by inspecting the instruction codes for determining the length of the instructions, the partitioning block 47 delivering at each clock cycle an instruction to an instruction register 48.

In the decoding unit 37 parameters of an instruction are extracted in a unit 51. The operation code of the instruction is extracted in a block 53 and it is used as an input address of a decoding table 55, listing the addresses of the microcode instructions to be actually used by the arithmetic/logic unit 33. The determined microinstructions are transmitted to a buffer 57 for four instructions in the buffer unit 39.

The two pipelining paths A, B are joined by a selector unit 59 which selects the correct path for the next instruction depending on the result of executed and/or predicted jump instructions, sending the next instruction to the arithmetic/logic unit 33.

The program code translation unit 31 is controlled by various signals, illustrated by the control or state signal block 61. In particular there is a signal indicating whether the trace condition is on or off, this signal being shown symbolically by the subblock 63.

Figure 2:
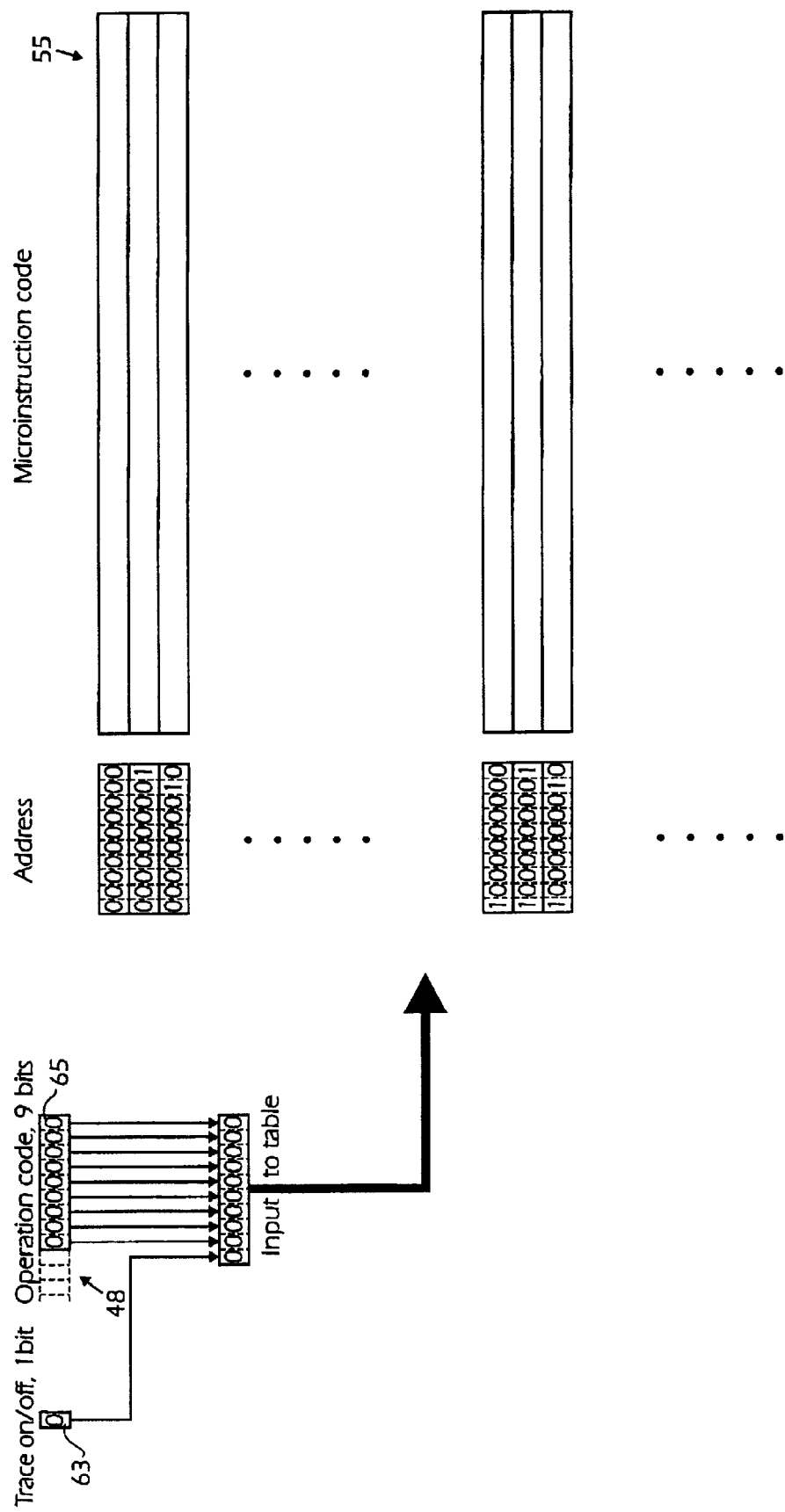
FIG. 2 is a picture illustrating the table look-up carried out in the microprogram decoder in FIG. 1.

The instruction decoding unit 37 is directly connected to the instruction register 48, in particular the operation code portion of the instruction being provided on direct lines to the decoding block 53. The operation of the decoding block is schematically illustrated in FIG. 2, in which the operation code portion of the instruction register 48 is represented as by the block 65. In the considered embodiment the operation code comprises 9 bits at the least significant end of an instruction and the corresponding 9 lines from the instruction register 48 are extended by one additional line carrying the signal indicating the trace condition, see block 63. The signals on the resulting ten lines are used as inputs for accessing a microinstruction table 55, comprising a list of all microinstruction codes used. $2^{10}$ microinstruction codes can be used and each microinstruction has a position or address in the table. That microinstruction having a position or address matching that signalled on said ten lines is selected.

This selection process and the table can be made by providing e.g. a large logical gating network, having a rather large depth, i.e. having a multitude of logical levels, the network corresponding the table as outlined in FIG. 2. It will then obviously take some time until the selected microinstruction is provided on the output lines of the decoding unit 53. Adding a bit to the original operation code in the decoding will then result in that the table look-up will be somewhat slower and will also increase the complexity of the circuits actually performing the look-up. However, this will not degrade the over-all performance of the pipelining paths, in particular considering the conventional construction of always testing the trace enable signal when making the table look-up.

When using the method and device as described above, the microcode instructions executed when the trace enable signal is switched off will not comprise any trace supporting instructions and will therefore be executed relatively fast. If, on the other hand the trace enable signal is enabled, microcode instructions supporting a trace function will be executed and the execution will therefore be slower.

Finally, other signals than a trace enable signal may of course also be provided to the instruction decoder for signalling other conditions which change the choice of microinstruction corresponding to an original instruction as received from the memory 7. Thus generally, such a signal can be arranged to dynamically change the instruction decoding in response to the states of the signals applied thereto. Hence, different microinstruction may be addressed by the same operation code depending on the state of such a signal, whereby the microprogram can be optimized for the different states in which the computer is run at a particular moment, which will in turn increase the performance of the computer in some cases. An example of such a state which can benefit from the use of a dynamic instruction decoding can be a computer having different number representations, in which case different parts of the microprogram memory can be addressed depending on the number representation used at a considered occasion. Another example is the instruction "End Of Job" briefly discussed above.

Figure 3:
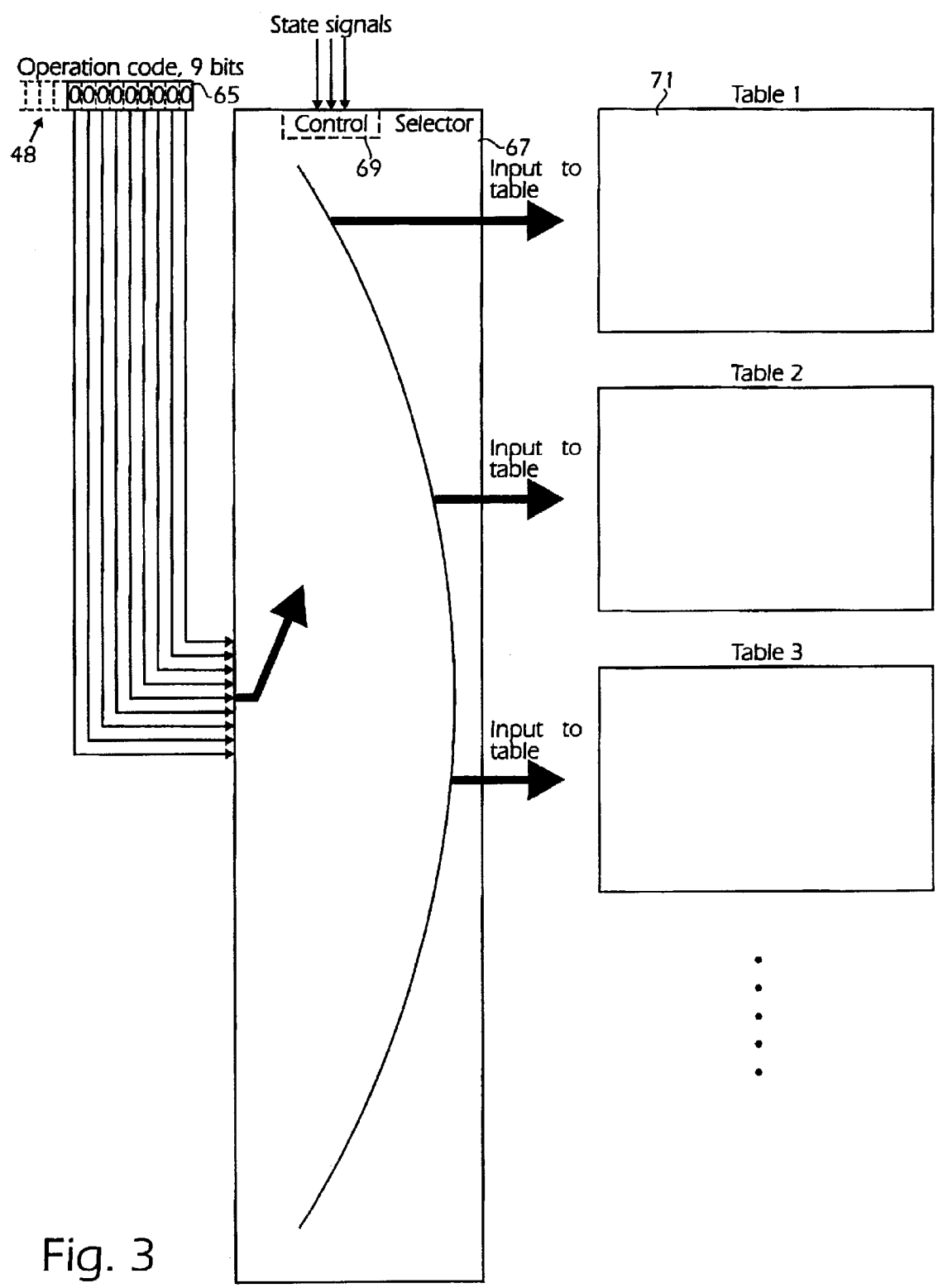
FIG. 3 is a schematic picture illustrating a controllable table look-up function.

This case in which more than one signal is used for controlling the translation into microinstructions is schematically illustrated by FIG. 3. Here the lines carrying a program operation code from the instruction register 48 are connected as inputs to a selector 67. The selector is controlled by state signals provided to a control unit 69 included in the selector 67. The control unit can be combinatorial circuit. In accordance with the control the selector 67 connects the input lines for a table look-up to one of parallel tables 71, which contain the microinstruction codes for the various cases of the values of the input state signals. This design results in a very versatile translation operation that can also be changed relatively easily.

While specific embodiments of the invention have been illustrated and described herein, it is realized that numerous additional advantages, modifications and changes will readily occur to those skilled in the art. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention.

What is claimed is:

1. A digital processor for executing program instructions, the digital processor generating or receiving at least one general state signal for controlling the general state of the digital processor, the digital processor having two pipelining paths, each pipelining path comprising:
   a translating device for translating sequentially program instructions to microinstructions using the operation codes of the program instructions as an input of or an address to a translating table of microinstruction codes and thereby generating for each program instruction one microinstruction;
   a buffer connected to the translating device for receiving and storing a plurality of microinstructions generated by the translating device;
   a selector unit joining the buffers of the two pipelining paths and selecting the correct path for the next instruction depending on the result of executed or predicted program instructions of jump type; and
   an execution unit connected to the selector unit for receiving microinstructions from the selector unit and executing the microinstructions;
   wherein the translation device is connected to receive the at least one general state signal and is arranged to translate the program instructions to microinstructions depending on values of the at least one general state signal, and wherein the at least one general state signal comprises a signal indicating whether or not a trace function is enabled in the digital processor, said digital processor executing optimized microinstructions when said trace function is disabled.

2. The digital processor of claim 1, wherein the translating device is arranged to translate the program instructions so that at least one program instruction is translated to different microinstructions for different values of at least one of the at least one state signals.

3. The digital processor of claim 1, wherein a first part of the translating table is used by the translating device for translating program instructions for a first value of a state signal and a second part of the translating table is used by the translating device for translating program instructions for a second value of a state signal, the second value being different from the first value.

4. The digital processor according to claim 3, wherein the first and second parts of the translating table are disjoint.

5. The digital processor of claim 1, wherein the translating device is arranged to use as an input or an address in the translating table the operation code of a program instruction, to which is added at least one bit position containing the value of at least one state signal.

6. The digital processor of claim 1, wherein the translating table is a combinatorial circuit comprising logical gates forming a translation array.

7. A method of executing program instructions in a digital pipelined processor comprising the steps of:
   generating or receiving at least one general state signal for controlling the general state of the digital processor;
   performing in each of two pipelining paths:
      receiving the program instructions;
      translating operation codes of the received program instructions to microinstructions and then using the operation codes as inputs or addresses to a translating table of microinstruction codes, thereby generating for each program instruction one microinstruction; and
      storing a plurality of the microinstructions generated by the translating device;
      selecting one microinstruction among a next microinstruction stored for a first one of the pipelining paths and a next microinstruction stored for a second, different one of the pipelining paths, depending on the result of executed or predicted program instructions of jump type; and
      executing the selected microinstruction;
   wherein the translating of the operation codes in each pipelining path is made according to values of the at least one general state signal, so that the resulting microinstructions are made to be dependent on said values, and wherein the at least one general state signal comprises a signal indicating whether or not a trace function is enabled in the digital processor, said digital processor executing optimized microinstructions when said trace function is disabled.

8. A method of claim 7, wherein the translating of the operation codes is made so that at least one program instruction is translated to different microinstructions for different values of at least one of the at least one state signals.

9. The method of claim 7, wherein the translating is made in accordance with a translating table, the translating table having first and second parts, and the translating is furthermore made in accordance with the first part for a first value of a state signal and in accordance with the second part for a second value of a state signal, the second value being different from the first value.

10. The method of claim 9, wherein the translating is made using disjoint first and second parts of the translating table.

11. The method of claim 7, wherein the translating is made in accordance with a translating table, using as an input or address in the translating table the operation code of a program instruction, to which is added at least bit one position indicating the value or values of at least one of the at least one state signals.

* * * * *